United States Patent [19]
Bunyard

[11] 3,851,658
[45] Dec. 3, 1974

[54] VALVE
[75] Inventor: Alan Donald Bunyard, Haywards Heath, England
[73] Assignee: Norbro Pneumatics Limited, Sussex, England
[22] Filed: Aug. 7, 1970
[21] Appl. No.: 61,932

[30] Foreign Application Priority Data
Aug. 9, 1969   Great Britain .................... 39966/69

[52] U.S. Cl. ............................................... 137/102
[51] Int. Cl. ............................................. F16k 11/02
[58] Field of Search ....... 137/102; 138/46; 251/121, 251/343, 345

[56] References Cited
UNITED STATES PATENTS
| | | | |
|---|---|---|---|
| 2,524,569 | 10/1950 | Matteson | 138/46 |
| 2,567,391 | 9/1951 | Mead | 137/102 |
| 2,716,997 | 9/1955 | Crookston | 137/102 |
| 3,065,761 | 11/1962 | Peras | 137/102 |
| 3,086,542 | 4/1963 | Mosier | 137/102 |
| 3,518,989 | 7/1970 | Seeler | 137/102 |
| 3,519,011 | 7/1970 | Pennanen | 137/102 X |
| 3,599,657 | 8/1971 | Maldavs | 137/102 |

FOREIGN PATENTS OR APPLICATIONS
1,031,887   3/1953   France ............................... 137/102

Primary Examiner—Robert G. Nilson
Attorney, Agent, or Firm—Berman, Bishoff & Platt

[57] ABSTRACT

A valve operable as a speed controller for air cylinders. On the inlet stroke, air entering the controller causes a cup seal to close the exhaust port and flows past said cup seal to the cylinder. On the return stroke, the used air causes said cup seal to open the exhaust port and to close the inlet port, whereby the air is vented to atmosphere. The exhaust port can be throttled by an adjustable control ring in order to restrict the effective exhaust port area.

8 Claims, 5 Drawing Figures

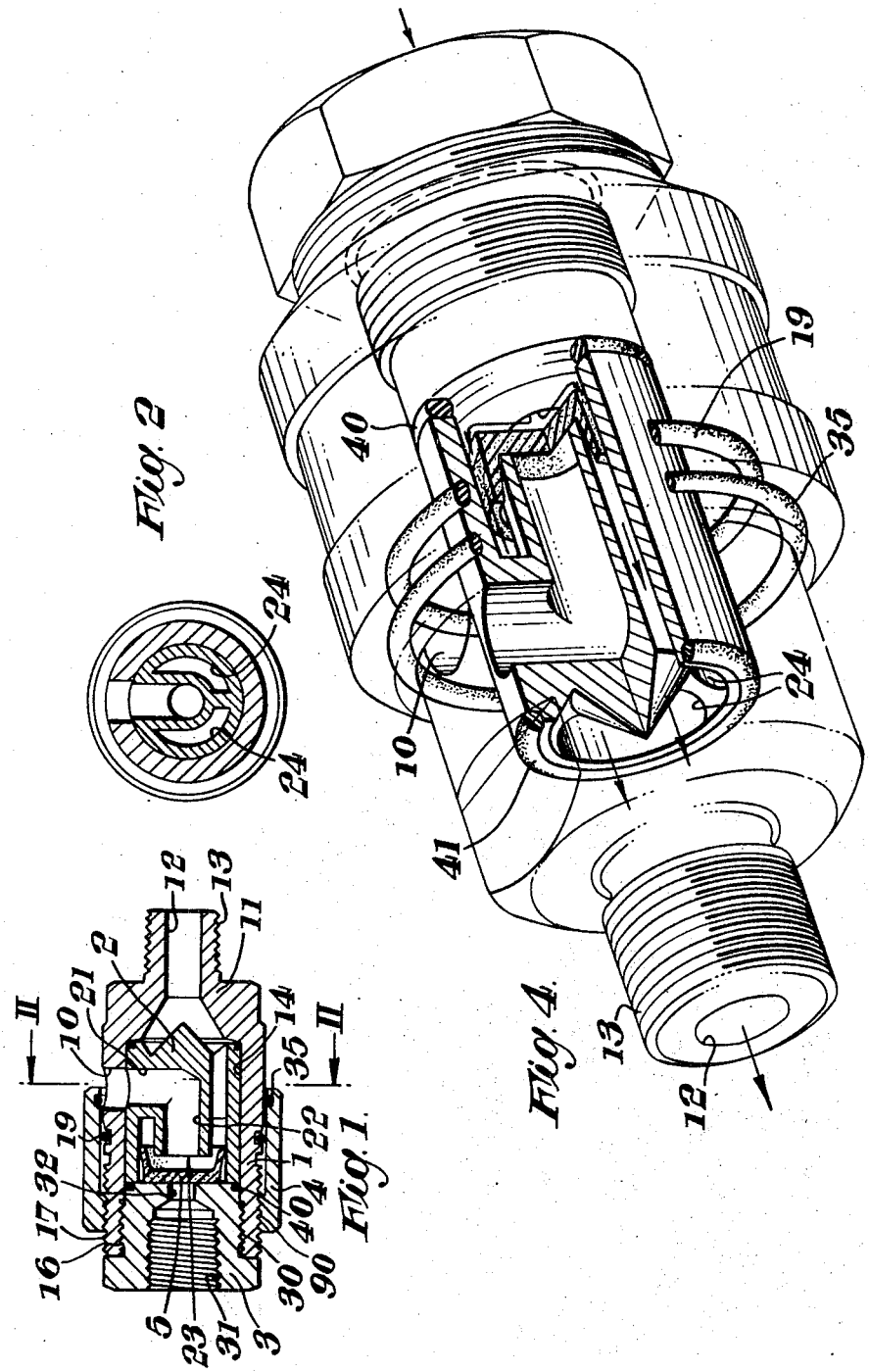

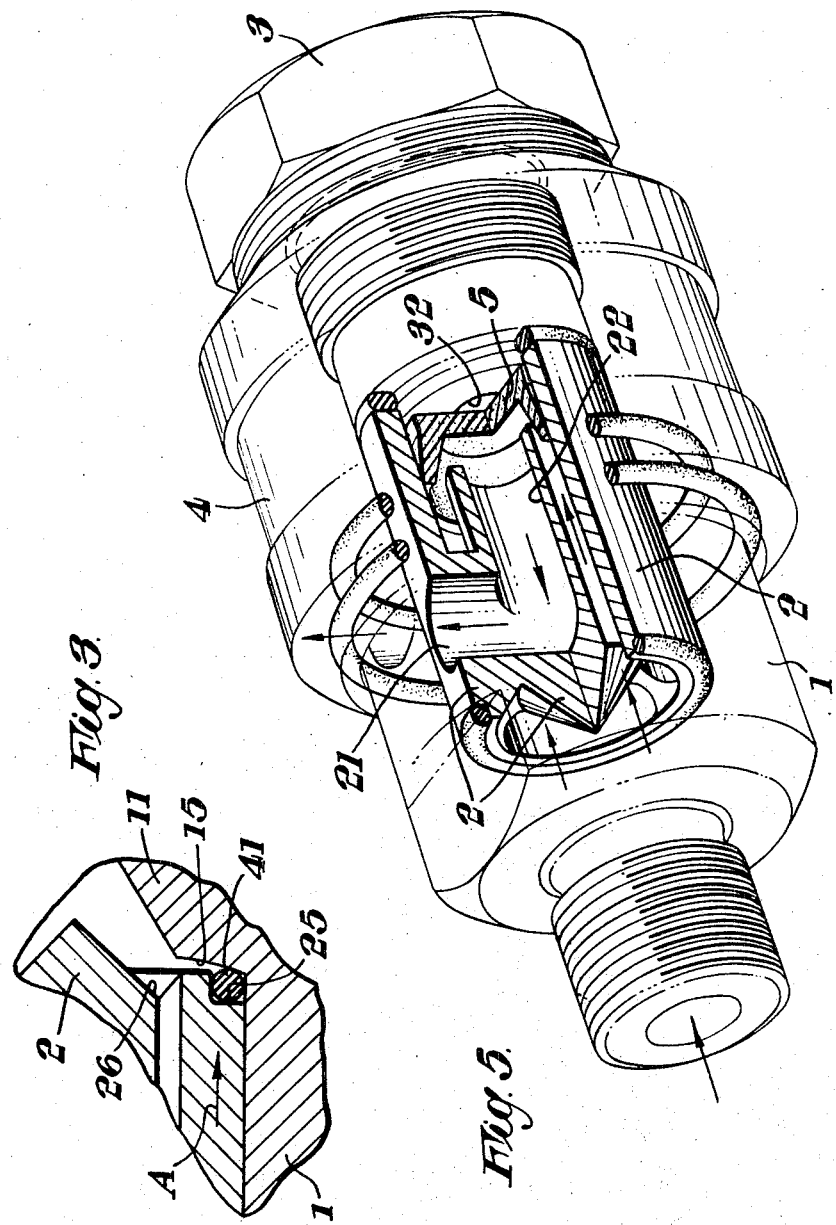

VALVE

This invention relates to a valve.

The present invention consists in a valve which includes an elongated body having therein an inlet port, an outlet port, an exhaust port, a device positionable within said body in one of two positions at a time and a port obturator, said inlet and said outlet ports being in axial alignment with one another and said obturator being adapted for movement relative to said body in directions parallel to the axis common to said inlet and said outlet ports, the arrangement being such that the device is adapted to become so positioned in response to pressure differentials across the valve in order to control fluid flow either through the outlet port only or through the exhaust port only and such that the obturator is adapted to throttle the exhaust port to a degree which is accurately adjustable, whereby said valve is selectively operable either as a fluid flow regulator or as a quick exhaust valve.

In a preferred embodiment of said valve, said elongated body has an outer surface and an inner surface which defines a continuous cylindrical axial bore which extends through said body over a part of the axial length of said body; first means integral with said body at one end of said body and having one of said inlet port and said outlet port formed therein, said port being permissive of the passage therethrough of a pressurised fluid into said axial bore; a removable insert of substantially right cylindrical form and of axial length such as to extend from said first means to a location short of said other end of said body, the outside diameter of said right cylindrical insert being substantially the same as the diameter of said axial bore; a radially directed exhaust port in said body and located intermediate said one and said other ends thereof; a bore in said insert, said bore consisting of a bore portion extending axially of said insert and a bore portion extending radially of said insert, said bore portions being in communication with one another, said radial bore portion being adapted to establish communication between the radially directed exhaust port and the axial bore of said body by way of said axial bore portion; said radially extending bore portion being formed in said insert at a location intermediate the ends thereof and said axially extending bore portion extending towards said other end of said body from the radially inner end of the radially extending bore portion; a valve seat on said insert at that end of said axially extending bore portion which is remote from said radially extending bore portion; second means detachably connectable to said body at the other end of said body so as to be substantially coaxial therewith and so as to maintain said insert within the confines of said elongated body, said second means having the other of said inlet port and said outlet port formed therein and said port being permissive of the passage therethrough of a pressurised fluid into said axial bore; said device being located between said valve seat and the axially inner end of said second means; and at least one passageway adapted to establish communication between said inlet port and said outlet port on the one hand and between said outlet port and said axially extending bore portion on the other hand. Preferably, the junction between said body and said first means forms a non-radial shoulder, said insert having a groove in that end thereof which is remote from said valve seat and accommodating an O-seal in said groove, said second means having an annular shoulder at that end thereof which is intended to bear against the respective end of the insert, a second O-seal encircling said second means and abutting said annular shoulder, whereby leakage of the pressurised fluid under conditions of violent temperature range or fluctuation is prevented by said O-seal and said second O-seal by virtue of the fact that the insert has a limited freedom for expansion axially of said elongated body under the influence of heat which will deform at least said O-seal in order to maintain fluid-tightness between the insert and the elongated body.

The obturator preferably is a ring which is internally screw threaded over a part of its axial length and which is therewith adapted to engage a complementary screw thread formed in said outer surface of said body. Again, preferably, said obturator carries a ring seal which is accommodated in a seat formed in the radially inner surface of said obturator and adjacent that end of the obturator which is remote from its internal screw thread, the obturator being metal and the ring seal being made of, for example, P.T.F.E., whereby a fine degree of adjustment of the throttling of the exhaust port is obtainable.

Said device in said alternative embodiment is preferably a cup seal but may be a simple disc constituting a flap seal or a ball.

In the preferred form of said alternative embodiment, the insert is made of P.T.F.E. or of a material which possesses or has been treated to possess properties similar to those of P.T.F.E. One example of a material which has been treated to possess such properties is Delrin (Registered Trade Mark) which has been treated with P.T.F.E. We have found that, with said insert made of P.T.F.E. and with a cup seal employed to control fluid flow either through the outlet port only or through the exhaust port only, the cup seal shows little or no tendency to "stick" in a position intermediate its two operating positions.

The present invention will now be more particularly described with reference to the accompanying drawings, in which:

FIG. 1 illustrates an axial section through the preferred embodiment of a valve according to the present invention and which comprises an elongated body, an insert, an end cap and a control ring or port obturator;

FIG. 2 is a section of said valve taken on the line II—II in FIG. 1;

FIG. 3 is a detail view of a part of one end of said insert, a part of one portion of said elongated body and an O-seal which is located in a seat therefor formed in said insert; and FIGS. 4 and 5 illustrate in perspective and partially cut-away the valve in its two operating conditions, namely, inlet or input and exhaust.

In the drawings, there is illustrated a valve which comprises an elongated body 1 and an end cap 3 both made for example of aluminium alloy, an insert 2 made for example of DELRIN (Registered Trade Mark), a control ring or port obturator 4 made of metal, for example of aluminium, a cup seal 5, or shuttle valve, made of high nitrile rubber and an O-seal 41.

The elongated body 1 has a radially directed exhaust port 10 therein and an integral end cap 11 having an outlet port 12 formed therein. An exterior screw thread 13 is also provided to facilitate connection of said valve to the input port of an air cylinder or rotary actuator. The bore 14 in said body is right cylindrical and the junction between the end cap 11 and the body 1 provides a non-radial shoulder 15 (see FIG. 3), and the other end of the body 1 is screw-threaded internally and externally at 16 and 17, respectively. The threaded portion 16 is to facilitate detachable connection of said valve to the threaded part of the end cap 3 whilst the threaded portion 17 is for the adjustable control ring or port obturator hereinafter described.

The insert 2 is provided with a radially extending bore portion 21 which, in turn, is in communication with an axially extending bore portion 22 which terminates at a valve seat 23. Passageways 24 (see FIGS. 2 and 4) by-pass said bore portions 21, 22 and extend axially of said insert. A groove 25 is provided at that end of said insert which is remote from the seat 23 for abutment against the shoulder 15 of said body and said end is relieved axially at 26 (see FIG. 3) to permit the passage of pressurised air in one of two directions at a time along the passageways 24.

Said end cap 3 is externally threaded at 30 and is internally threaded at 31 to facilitate connection of the valve to one end of a supply line from a source of pressurised air (not illustrated) and said end cap is provided with an inlet port 32.

The control ring or port obturator 4 is a simple ring provided with an internal screw thread 90 over a part of its axial length which is intended for engagement with the screw thread 17 provided on the body 1, and said obturator has a radially inwardly facing seat formed therein for the accommodation therein of a ring seal 35 for a purpose hereinafter explained.

Furthermore, said end cap 3 is provided with an annular radially extending shoulder extending completely around that end of the cap which abuts the insert 2, said shoulder being formed by making an axially directed groove in said end of the cap but said groove is not indicated by a reference numeral because of the lack of clarity of the drawing which would inevitably result. However, said groove is intended to accommodate an O-seal 40.

Likewise, said groove 25 is intended to accommodate an O-seal 41.

It will be seen from FIG. 1 that, with the valve connected for example to a rotary actuator which controls a ball valve and also connected to a source of pressurised air, and with the obturator 4 positioned so as to permit quick exhaust of used air through the port 10, pressurised air supplied to the inlet port 32 will displace the cup seal 5 towards and into sealing contact with the valve seat 23 by virtue of the pressure differential across the valve and will thereafter, after deformation of the flexible rim of said cup seal, pass along the passageways 24 to the outlet port 12 to said actuator (direction of flow of pressurised air is indicated by the arrows in FIG. 4). When a pressure differential across the valve is created which is the opposite of that mentioned in the preceding sentence and when the obturator 4 is positioned so as to permit quick exhaust of used air to atmosphere through the port 10, used air will pass along the passageways 24 from right to left as seen in FIG. 1 and the cup seal 5 will move under the influence thereof away from the valve seat 23 into sealing contact with the axially inner face of the end cap 3 (that is, into the position thereof illustrated in FIG. 1), with the result that the used air will be able to pass along the bore portions 22 and 21 and thence to atmosphere through the exhaust port 10 which is in radial register with the bore portion 21 (direction of flow of exhausted used air is indicated by the arrows in FIG. 5).

When it is desired to control the rate of flow of the used air through the exhaust port 10 in order in turn to control the speed of travel of, for example, the piston or pistons in the actuator, the obturator is adjusted to throttle the exhaust port 10 to the required degree. It will be noted that the body 1 is provided with circumferential groove which constitutes a seat for the accommodation of an O-seal 19 (FIG. 1) whose outside diameter is such as not only to prevent any leakage of used air by way of the mating screw threads 17 and 90 and thereby to ensure the optimum throttling of the exhaust port 10 by the obturator 4 in all settings thereof but also to ensure that the obturator 4 is held against a vibration-induced tendency for said obturator to rotate about its axis of rotation in such a manner as to uncover more of the area of the exhaust port 10 than is for the time being desired. Furthermore, said O-seal 19 has the advantage of ensuring that the obturator 4 does not, under the influence of vibration, accidentally become completely detached from the body 1 as could easily happen for example during transport of the valve by lorry from a store to the site at which said valve is to be used.

Said ring seal 35 should be of a cross-section sufficient to form a seal with the outer surface of the body 1 without being too sensitive to likely temperature fluctuations. We have found P.T.F.E. to be a very satisfactory material from which to make the ring seal 35 as it is not liable to become nipped (as we believe rubber would, for example) between the leading periphery of the obturator and the periphery of the exhaust port 10 as the obturator starts to cover said port 10 completely. Furthermore, P.T.F.E. seems to possess exactly the correct relationship between breakout friction and running friction, said relationship giving rise to great ease of rotation of said obturator 4 with respect to said body 1 by extremely small amounts to obtain fine adjustments of exhaust rate. Furthermore, said ring seal 35 obviously assists in achieving the correct maximum degree of throttling of said exhaust port 10.

It was found, with an early prototype of the valve, that, under conditions of violent temperature range or fluctuation, leakage of the fluid medium which was being controlled could result. Specifically, if the elongated body and the end cap were made for example of an aluminium alloy and if the insert were made of a synthetic resin material, for example P.T.F.E. or DELRIN (Registered Trade Mark) which has been treated with P.T.F.E., the insert would enlarge at a greater rate than would the elongated body and the end cap, this being due to the greater coefficient of expansion of the synthetic resin material and this will result in permanent deformation of the insert and, when the installation which contained the valve cooled down, the deformed insert would not effectively seal against the inner surfaces of the elongated body and the fluid medium being controlled would escape. This defect has been overcome in the valve according to the invention by the provision of the O-seals 40, 41 which are made preferably of high nitryl rubber, and particularly by the provision of the O-seal 41. If an installation which includes the valve described above were to operate in a location at which the temperature is likely to rise considerably from a lower ambient temperature, the greater coefficient of expansion of the material from which the insert 2 is made will cause the insert 2 to increase in length in the direction of the arrow A (see FIG. 3) and this will in turn at least maintain the requisite fluid-tight seal between the main portion 1 of the elongated body and the insert 2 by virtue of deformation of at least the O-seal 41 and will possibly improve said fluid-tight seal.

Tests which have been carried out have demonstrated that, by using for example a valve according to the present invention having a bore of one-eighth of an inch on a 4 inch diameter air cylinder having a stroke of 9 inches, operation time was improved from 6.2 seconds without the valve to 2.2 seconds with the valve.

Moreover, by using a valve having a bore of one quarter of an inch upon the same air cylinder, the operation time was even further reduced and specifically was reduced to 1.6 seconds.

The valve according to the present invention combines the functions of a flow-control valve and a quick-exhaust valve and thereby saves money.

Further, in an early prototype of the valve, the insert was formed with oppositely directed radially extending bore portions each of which was in fluid communication with an axially extending bore portion and the elongated body had diametrically opposed exhaust ports therein which, in use of the valve, were in exact register with the oppositely directed bore portions of the insert. In simplifying the insert and elongated body construction by the use of only one exhaust port (namely, the port 10) in said body and of only one radially extending bore portion (namely, the bore portion 21), it is not to be assumed that the earlier version will not function properly. In fact, the early prototype functioned very satisfactorily and the appended claims are intended to include within their scope a valve construction which has said oppositely directed radially extending bore portions in the insert and said diametrically opposed exhaust ports in register therewith in the elongated body, or which has any mechanical equivalent of such arrangement.

What I claim as my invention and desire to secure by Letters Patent of the United States is:

1. A valve comprising an elongated hollow body having an axial bore extending therethrough, an inlet port at one end, an outlet port near the other end and an exhaust port intermediate the ends of the body, an elongated removable insert in said bore having a first passageway extending axially from end-to-end of the insert and communicating at both ends with said bore and a second passageway extending from one end to the periphery of the insert and communicating with said exhaust port, a cup seal of resilient material having a bottom wall and a peripheral rim disposed within the bore of said hollow body with its bottom wall adjacent said inlet port and transverse to the axis of the bore and its rim engaging said insert at the entrance to said first passageway, said cup seal being bodily movable between two positions in response to pressure differentials across the valve at said inlet and outlet ports, said cup seal in its first position having its bottom wall against and closing said inlet port and its rim distended to permit communication between said first and second passageways of said insert through the interior of said cup seal so that a fluid flow path is established from the outlet port through the first and second passageways in sequence to the exhaust port, said cup seal in its second position having its bottom wall against and closing said second passageway and its rim compressed inwardly to open the first passageway so that a fluid flow path is established from the inlet port around the rim of the cup seal through the first passageway to the outlet port, whereby to control fluid flow either through the inlet port to the outlet port or through the outlet port to the exhaust port and the valve is selectively operable either as a fluid flow regulator or as a quick exhaust valve.

2. A valve as claimed in claim 1, wherein said inlet and outlet ports are in axial alignment with one another, and an obturator is movably mounted on said hollow body in directions parallel to the axis common to said inlet and outlet ports, where to enable adjustment of fluid flow through said exhaust port.

3. A valve as claimed in claim 2, wherein the obturator is a ring which is internally screw threaded over a part of its axial length and wherein a complementary screw thread is formed in the outer surface of said body, the screw thread of the ring and the screw thread of the body engaging one another to permit said throttling of the exhaust port.

4. A valve as claimed in claim 3, wherein a groove is formed in the radially inner periphery of the ring and adjacent that end thereof which is remote from the internal screw thread thereof, a ring seal accommodated in said groove, said ring seal providing frictional grip between said ring and said body such that a fine degree of adjustment of the throttling of the exhaust portion is obtainable together with efficient maximum throttling of the exhaust port when the ring has been adjusted to cover said exhaust port.

5. A valve as claimed in claim 4, wherein there is a circumferential groove formed in the outer periphery of said body, an O-seal located in said groove, said O-seal having an outside diameter such that leakage of used pressurised fluid to atmosphere by way of said exhaust port and by way of said complementary screw threads on said body and said ring is prevented and such that any vibration-induced tendency of the ring to rotate about its axis of rotation from a setting to which it has been adjusted is also prevented.

6. A valve as claimed in claim 1, wherein said axial bore of the body is continuous and cylindrical, first means integral with said body at one end of said body and having said outlet port formed therein, said removable insert being of substantially right cylindrical form and of axial length such as to extend from said first means to a location short of said other end of said body, the outside diameter of said right cylindrical insert being substantially the same as the diameter of said axial bore, said exhaust port being radially directed in said body, said first passageway in said insert being a bore extending parallel to the axis of the insert, said second passageway including a bore portion extending axially of said insert and a bore portion extending radially of said insert, a valve seat on said insert at that end of said axially extending bore portion which is remote from said radially extending bore portion, second means detachably connectible to said body at the other end of said body so as to be substantially coaxial therewith and so as to maintain said insert within the confines of said elongated body, said second means having said inlet port formed therein, and said cup seal being located between said valve seat and the axially inner end of said second means.

7. A valve as claimed in claim 6, wherein said body and said first means are integrally joined to form a non-radial shoulder, said insert having a groove in that end thereof which is remote from said valve seat and accommodating a first O-seal in said groove, said second means having an annular shoulder at that end thereof which is intended to bear against the respective end of the insert, a second O-seal encircling said second means and abutting said annular shoulder, whereby leakage of the pressurised fluid under conditions of violent temperature range or fluctuation is prevented by said O-seals by virtue of the fact that the insert has a limited freedom for expansion axially of said elongated body under the influence of heat which will deform at least said first O-seal in order to maintain fluidtightness between the insert and the elongated body.

8. A valve as claimed in claim 1, wherein said cup seal has a continuous disc-like surface forming said bottom wall and the rim of the cup seal is outwardly flared, said rim being deformable inwardly upon existence of greater fluid pressure from the direction of said disc-like surface than from the opposite direction.

* * * * *